(12) United States Patent
Fujiwara (10) Patent No.: US 8,693,035 B2
(45) Date of Patent: Apr. 8, 2014

(54) DATA PROCESSING APPARATUS AND DATA PROCESSING METHOD FOR PERFORMING PREDETERMINED PROCESS AT A DIFFERENT PROCESSING NODE

(75) Inventor: Akihiko Fujiwara, Kanagawa (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 338 days.

(21) Appl. No.: 13/169,133

(22) Filed: Jun. 27, 2011

(65) Prior Publication Data

US 2011/0317216 A1    Dec. 29, 2011

Related U.S. Application Data

(60) Provisional application No. 61/359,163, filed on Jun. 28, 2010.

(51) Int. Cl.
*G06F 3/12* (2006.01)
*H04N 1/00* (2006.01)

(52) U.S. Cl.
USPC ........... 358/1.15; 358/401; 358/402; 358/425

(58) Field of Classification Search
USPC ......... 358/1.15; 370/351, 408, 422, 424, 431; 709/208, 213, 217, 220, 223, 227, 238
See application file for complete search history.

(56) References Cited

U.S. PATENT DOCUMENTS

| | | | |
|---|---|---|---|
| 6,633,538 B1* | 10/2003 | Tanaka et al. | 370/222 |
| 7,987,241 B2* | 7/2011 | St Jacques et al. | 709/217 |
| 8,320,282 B2* | 11/2012 | Rollins | 370/258 |
| 2010/0094925 A1* | 4/2010 | St Jacques et al. | 709/202 |
| 2010/0328705 A1* | 12/2010 | Kibler et al. | 358/1.15 |

* cited by examiner

*Primary Examiner* — Ngon Nguyen
(74) *Attorney, Agent, or Firm* — Amin, Turocy & Watson, LLP (57) ABSTRACT

According to one embodiment, a data processing apparatus includes a communicating unit, a managing unit, and a control unit. The communicating unit communicates with a plurality of external apparatuses. The managing unit manages first process information on a first process that is performed by a first external apparatus in the plurality of external apparatuses, and a first process result corresponding to the first process. The control unit transmits the first process result to a second external apparatus of a plurality of external apparatuses on the basis of the first process information, in accordance with a trouble of the first external apparatus, and gives an instruction of performing a second process following the first process with the second external apparatus.

18 Claims, 6 Drawing Sheets

| ID number | Job type | Job status | Specification of job status |
|---|---|---|---|
| 0001 | Scan & OCR | In acquiring of image data file | Two pages finished being acquired |
| | | | |
| | | | |
| | | | |

FIG. 7

| Job ID number | Node number | Process data type | Process data information |
|---|---|---|---|
| 0001 | Node A | Image data file folder | ¥¥Node A¥share¥0001¥image |
| 0001 | Node A | OCR-processed text data file folder | ¥¥Node A¥share¥0001¥txt |
| | | | |
| | | | |

FIG. 8

DATA PROCESSING APPARATUS AND DATA PROCESSING METHOD FOR PERFORMING PREDETERMINED PROCESS AT A DIFFERENT PROCESSING NODE

CROSS-REFERENCE TO RELATED APPLICATIONS

This application is based upon and claims the benefit of priority from U.S. Provisional Application No. 61/359,163, filed on Jun. 28, 2010; the entire contents of which are incorporated herein by reference.

FIELD

Embodiments described herein relate generally to a data processing apparatus and a data processing method.

BACKGROUND

A system in which a client, such as a web browser and a server communicate with each other, using the HTTP protocol and the like, is known in the art. For example, the client, such as a web browser, issues a request to the server using the HTTP protocol, or the like, and the like and the server performs a process corresponding to the request. The server balances loads when a large volume of request is issued from the client and the processing load which corresponds to the requests is large.

An NLB (Network Load Balancing), which is one of functions in the server products of the Windows OS by Microsoft Inc., is a known technology of distributing loads. The NLB is a technology of implementing a cluster configuration including a plurality of servers (each server is called a node) which perform processes according to requests, and appropriately distributing a job to the plurality of nodes that actually performs the process, in accordance with the volume of requests (a grouping of the requests is called a job) from a client. The technology is a technology that is generally used for web servers and the like which process access from a large number of web browsers.

However, the technology is a technology that is used under the assumption that the processes do not consume a large amount of resources of the servers. In the related art, even if malfunction (trouble) occurs in a node (a first node in the plurality of nodes) while the first node performs a predetermined process, it is possible to relatively easily perform the predetermined process, using another node (a second node in the plurality of nodes).

An image processing system where an MFP, such as an image processing apparatus, is connected by a web technology usually processes relatively large-sized data (image data). That is, the servers of the image processing system usually perform a process that consumes a large amount of resources. Assuming that large-sized data is processed, when malfunction (trouble) occurs in a node (a first node in the plurality of nodes) of the image processing system while the first node performs a predetermined process, it is required to reuse as much as possible the process result of the predetermined process obtained until the malfunction occurs in the first node. That is, it is required to perform the predetermined process, using another node (a second node in the plurality of nodes), by reusing the process result of the predetermined process obtained until the malfunction occurs in the first node, in the second node.

DETAILED DESCRIPTION

In general, according to one embodiment, a data processing apparatus includes a communicating unit, a managing unit, and a control unit. The communicating unit communicates with a plurality of external apparatuses. The managing unit manages first process information on a first process that is performed by a first external apparatus in the plurality of external apparatuses, and a first process result corresponding to the first process. The control unit instructs a second external apparatus of the plurality of external apparatuses to perform a second process following the first process by transmitting the first process result to the second external apparatus, on the basis of the first process information, in accordance with the trouble of the first external apparatus.

Hereinafter, embodiments will be described.

For example, assume an image processing system in which an MFP, such as an image processing apparatus, and servers (nodes) are connected through a network. The MFP (for example, an image capturing apparatus), which is a client, acquires an image data file by scanning an image of a paper document. The nodes receive the image data file and process the image data file to perform an OCR process (process of recognizing character information). That is, the nodes divide the image in the image data file into character string areas and convert the characters in the string areas into text information. An embodiment of exemplifying that division and conversion is performed by a node will be described.

Figure 1:
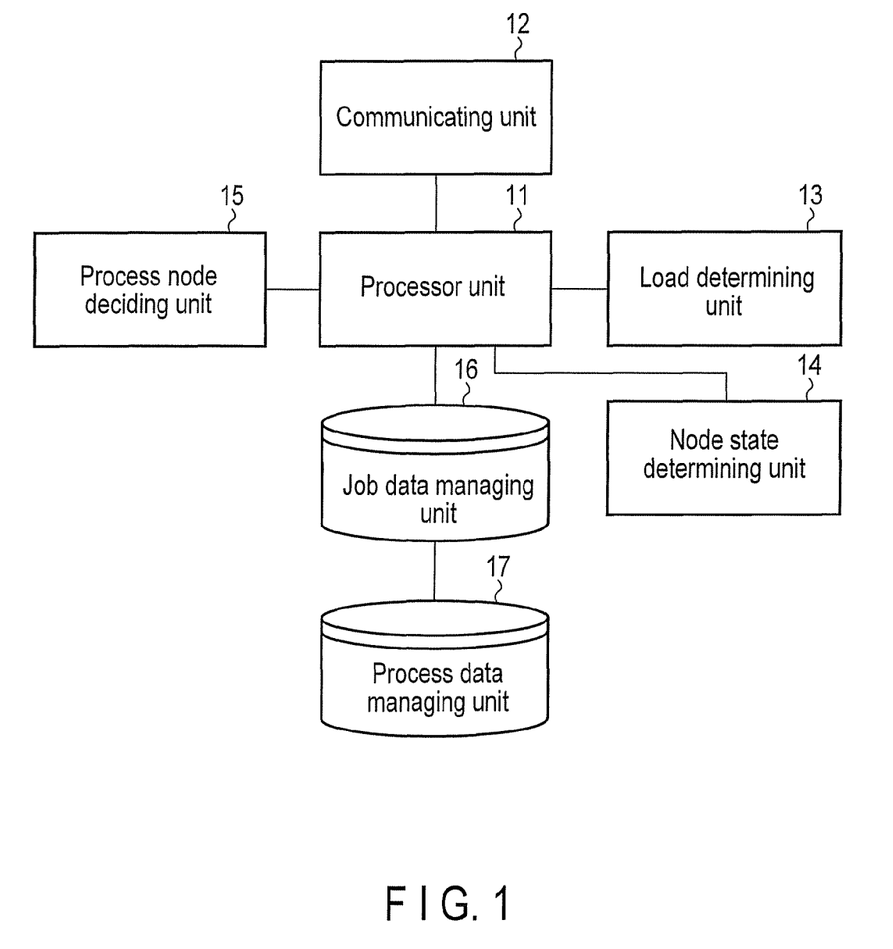
FIG. 1 is a diagram showing an example of a schematic configuration of nodes constituting an image processing system of an embodiment.

FIG. 1 is a diagram showing an example of a schematic configuration of nodes constituting an image processing system of an embodiment. The image processing system includes a plurality of nodes. Further, the cluster is implemented by combining the plurality of nodes.

As shown in FIG. 1, a node (node A shown in FIG. 2) is composed of a plurality of components. For example, the node includes a processor unit 11, a communication unit 12, a load determining unit 13, a node state determining unit 14, a process node deciding unit 15, a job data managing unit 16, and a process data managing unit 17. The other nodes (nodes B and C and master node M shown in FIG. 2) also have the same configuration as the node A.

The processor unit 11 is a processor, such as a CPU, and controls operation of the components of the node. The processor unit 11 may be the entire processor or may be implemented by virtually considering and operating one processor as a plurality of processors, such as in a virtual environment.

The communicating unit 12 communicates data through a network, such as LAN or WAN. For example, the communicating unit 12 includes a client communication interface for communication with a device that includes an image forming apparatus or an image capturing apparatus, such as an MFP, as a client. Further, the communicating unit 12 of the node A includes a node communication interface for communication with another node (for example, a node B). Further, if necessary, the communicating unit 12 may include a server communication interface for communication with another server, as a storage server that transmits an image process result.

The load determining unit 13 determines a server resource required to process a job that is a process unit of the image processing system. The load determining unit 13 can determine a server resource required for the statuses that process the job. For example, there may be a difference between the server resource required for the status while an image data file is acquired and the server resource required for the status in an OCR process. The load determining unit 13 can accurately determine the server resource required for the status while the image data file is acquired and the server resource required for the status in the OCR process.

The node state determining unit 14 (the node state determining unit 14 of the node A) determines which state the nodes (nodes A, B, and C and master node M) of the cluster are in. For example, the node state determining unit 14 can ask state information on another node through the node communication interface of the communicating unit 12. As the state information, information on whether another node is in operation, information on the resource (for example, the network usage rate, a CPU share, the amount of consumed memory) that is used at present in another node, and information whether another node is already assigned to process another job. Further, the state information can be acquired as totaling and statistical information for a predetermined period (for example, for ten minutes up to now), and the information can be acquired as a value at a point of time.

The process node deciding unit 15 decides a node that can process the job on the basis of the required server resource determined by the load determining unit 13 and the states of the nodes that are determined by the node state determining unit 14. For example, the process node deciding unit 15 can select a node having the most available resource on the basis a value at a point of time. Alternatively, the process node deciding unit 15 can expect using statistical information and select node.

The job data managing unit 16 manages information on the job. The information on the job is information of job identification (for example, an ID number uniquely given to every job), information for specifying the client, such as URL, a process parameter given to the job (for example, the values of parameters, such as resolution or a color mode of an image data file obtained by the image capturing apparatus), a status, such as process situation of the job (for example, the status while the image data file is acquired or the status during an OCR process), and information on the node that performs the process under the status (for example, the node A and the node B are used for the acquiring the image data file and the OCR process, respectively), and the like.

The processing data managing unit 17 manages information on process data that is processed in the job. The information of process data is an image data file obtained through the communication interface from the image capturing device and arrangement data of coordinate information of an edge detection result required to extract the part corresponding to a string of characters from the image data, and the like.

Figure 2:
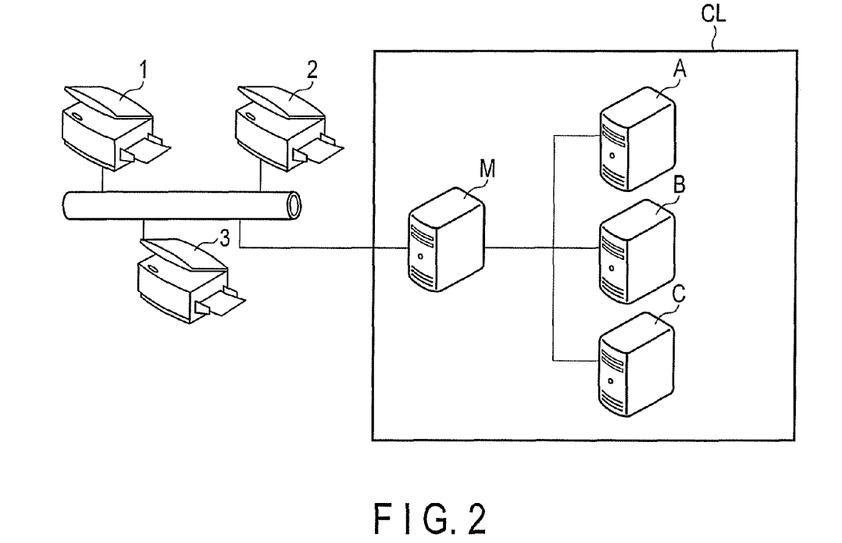
FIG. 2 is a diagram showing an example of an image processing system (cluster configuration of load distribution type) of an embodiment.

Next, the configuration of a node is described with reference to FIG. 2. FIG. 2 is a diagram showing an example of an image processing system (cluster configuration of load distribution type) of an embodiment. As shown in FIG. 2, the image processing system includes MFPs 1, 2, and 3, such as image processing apparatuses, connected through a network, further includes a master node M connected to the network, and further include distributed nodes A, B, and C connected to the master node M. A cluster CL1 is composed of the master node M and the nodes A, B, and C. Further, the MFPs 1, 2, and 3 are image capturing apparatuses or image forming apparatuses, or apparatuses having both functions of an image capturing apparatus and an image forming apparatus.

The cluster CL1 may include the master node M having a function of managing the entire process and distributed nodes A, B, and C that perform a process. In this case, the process data managing unit 17 of the master node M registers and manages a process result performed by the distributed nodes A, B, and C. Therefore, when malfunction (trouble) occurs in the distributed node A that performs a process, the communicating unit 12 of the master node M reassigns the process result (process data up to that time) performed by the distributed node A registered in the master node M to the distributed node B, such that the job performed in the distributed node A can be continued in the distributed node B.

Figure 3:
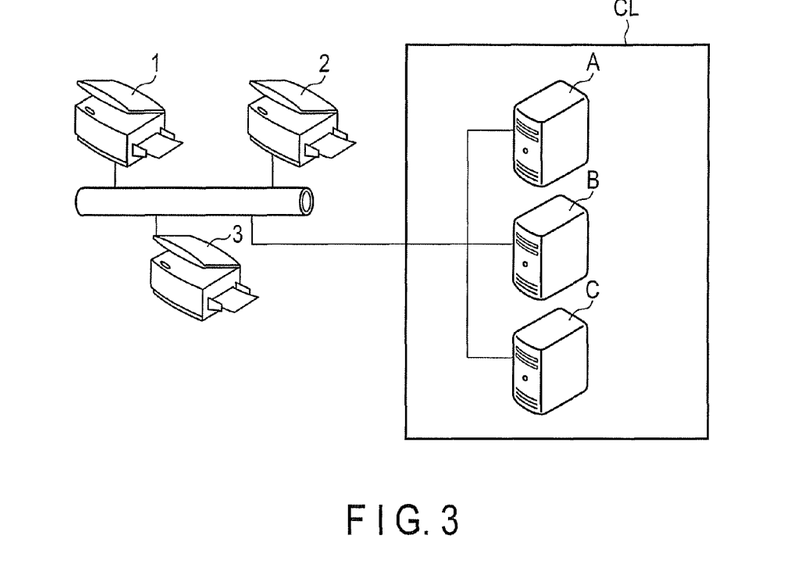
FIG. 3 is a diagram showing an example of an image processing system (cluster configuration of highly-available type) of an embodiment.

Next, the configuration of a node is described with reference to FIG. 3. FIG. 3 is a diagram showing an example of an image processing system (cluster configuration of highly-available type) of an embodiment. As shown in FIG. 3, the image processing system includes MFPs 1, 2, and 3 connected through a network and further includes nodes A, B, and C connected to the network. Further, a cluster CL2 is composed of the nodes A, B, and C. The cluster CL2 includes nodes A, B, and C that have the same function. In this case, for example, the node A decided by the process node deciding unit 15 of at least one node of the nodes A, B, and C performs the process. Further, the process data managing units 17 of the nodes B and C registers and manages a process result performed by the distributed node A. Therefore, when malfunction occurs in the distribute node A that is in operation of performing the process, at least one node of the nodes B and C reassigns the process result (process data up to that time) performed by the distributed node A registered, to the node B or the node C, such that the job performed in the node A can be continued in the node B or the node C.

Figure 4:
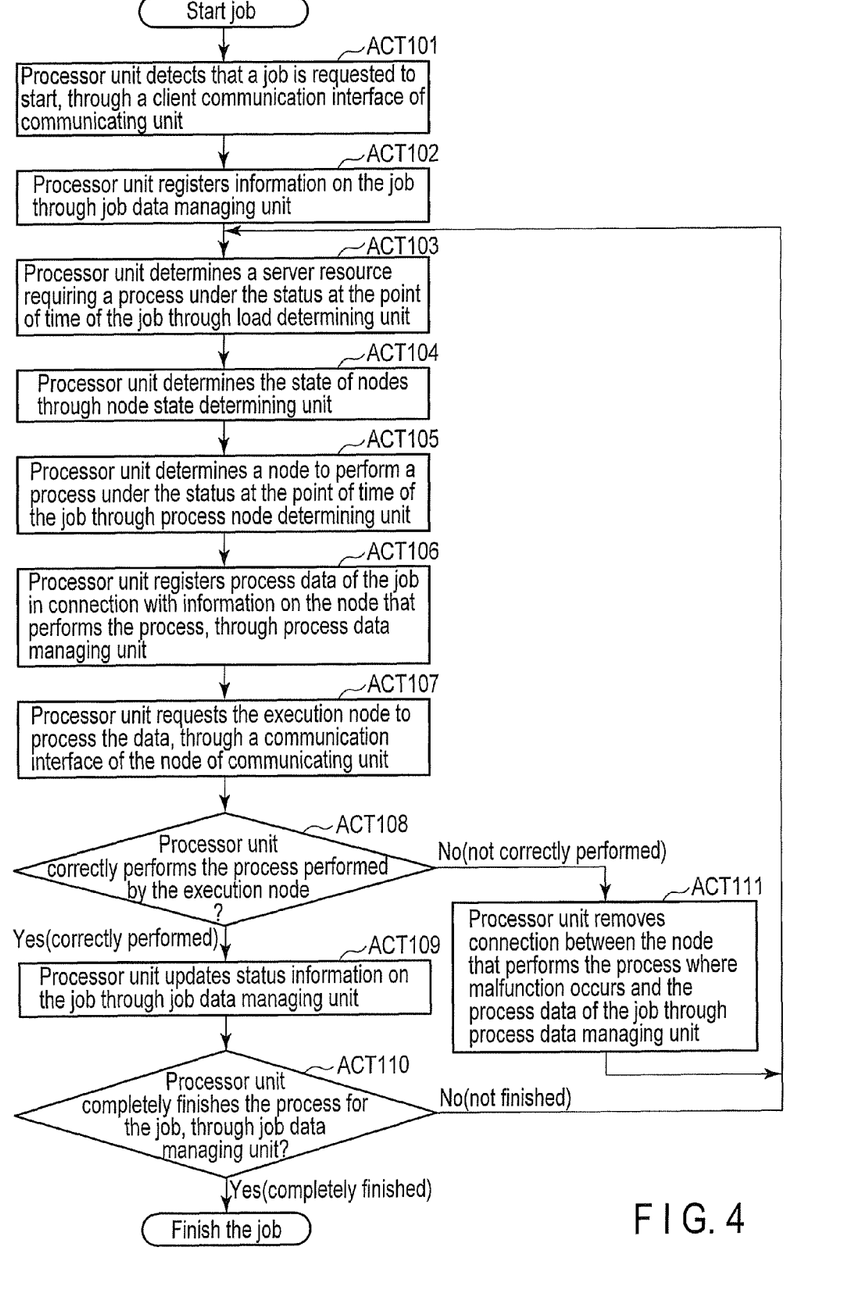
FIG. 4 is a flowchart illustrating a first example of node control.

A first example of node control in the image processing system shown in FIG. 2 is described with reference to FIG. 4. FIG. 4 is a flowchart illustrating the first example of node control in the image processing system shown in FIG. 2.

As shown in FIG. 4, for example, the master node M having a function of managing the entire process controls the node that performs the process. That is, the process data managing unit 17 of the master node M registers and manages a process result of the distributed node and reassigns the registered process result to another distributed node, when the processor unit 11 and the communicating unit 12 of the master node M detects that malfunction (trouble) occurs in the distributed node that performs the process. Accordingly, another distributed node can continue the following process.

For example, the MFP, such as an image processing apparatus, which is a client, gives an instruction of starting a job and the processor unit 11 detects that the job is started (ACT 101). For example, the MFP 1 includes a built-in web browser as a user interface and the web browser gives an instruction of starting the job by executing a web application supplied through the communicating unit 12.

Figure 7:
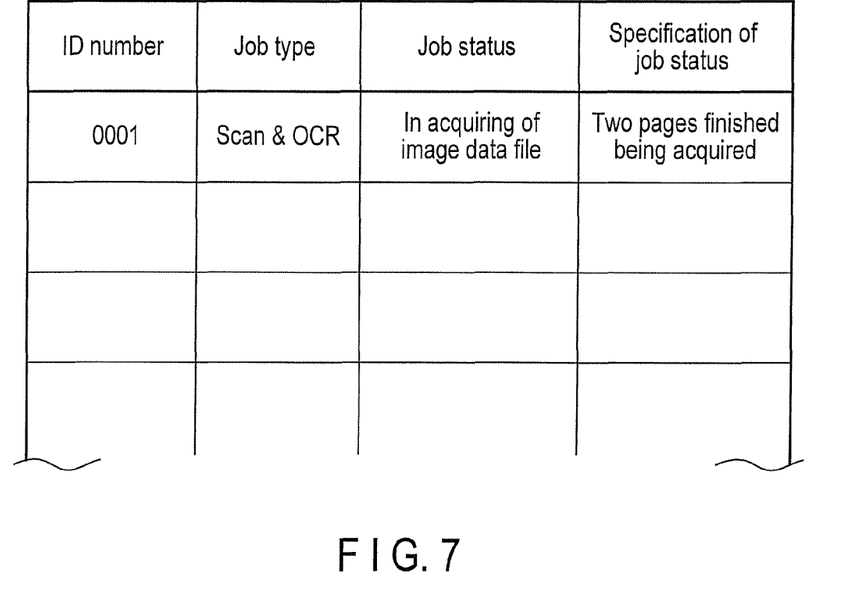
FIG. 7 is a diagram showing an example of a management information (table) that is managed by a job managing unit.

The processor unit 11 registers the information on the job for the job data managing unit 16 (ACT 102). The processor unit 11 gives an ID number that can be specifically identified when a new instruction of starting the job is given, and another item of information is managed and registered in connection with the ID number. FIG. 7 is a diagram showing an example of the related information. In the example, the information is managed as a database table and "ID number" is given when the job is registered. A name representing the type is given to the job and, in the example, a "type of job" for scanning and performing OCR is given. The type includes a peculiar process status and the status content is managed as a "job status". Further, when an image data file for each scanned page is acquired, the detailed progress situation of the pages is managed as "job status specification".

The processor unit 11 determines a server resource required to perform a process corresponding to the status of the job, through the load determining unit 13 (ACT 103). It is described when an image data file is acquired from the MFP that is a client, as the status of the job. A resource for controlling the operation of the MFP, using the client interface of the communicating unit 12 as a server (distributed node) is required to acquire the image data file by operating the image capturing apparatus of the MFP. An abnormally large amount of band of the network that the communicating unit 12 uses is consumed to acquire the image data file, in some cases. In these cases, the load determining unit 13 determines that the distributed node that is in charge of the process needs a network band and the processor unit 11 determines a required server resource from the determination.

The processor unit 11 determines which state the nodes constituting a cluster through the node state determining unit 14 are in. Since it is determined that a network band is needed in the status while the image data file is acquired, the processor unit 11 asks for an available node (supplied with power and being able to communicate) that which amount of network band is consumed now by the distributed nodes, through the node state determining unit 14, and determines the states of the distributed nodes on the basis of the result (ACT 104).

The processor unit 11 determines a node that performs a process under the status at the time point of the job, herein, a process of transmitting a file with respect to the status while the image data file is acquired, through the process node deciding unit 15 (ACT 105). The determined result in ACT 104 is used for the decision. In this example, it is assumed that the distributed node A is decided.

Figure 8:
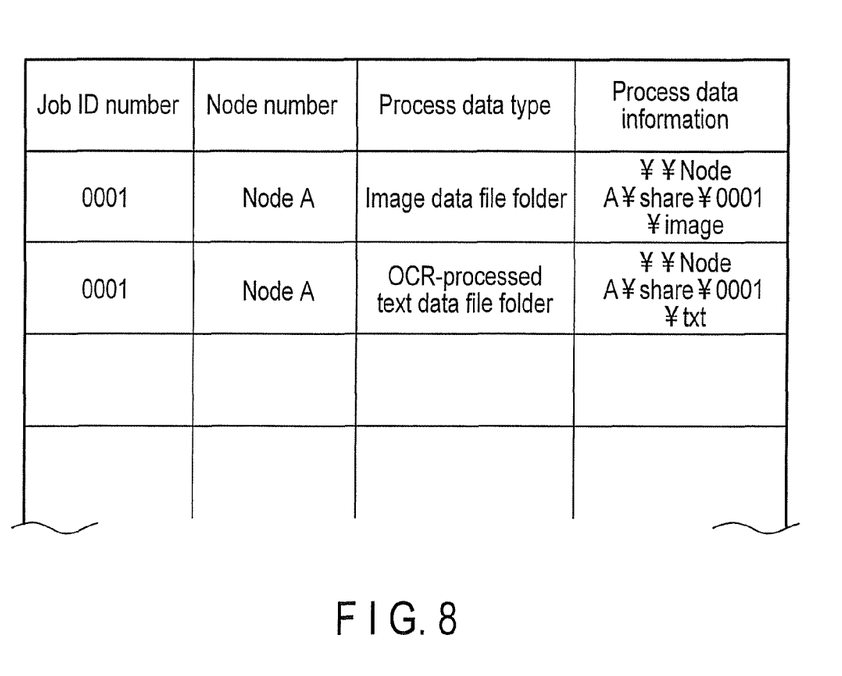
FIG. 8 is a diagram showing an example of a management information (table) that is managed by a process data managing unit.

The processor unit 11 registers the process data of the job in connection with the information on the node that performs the process, through the process data managing unit 17 (ACT 106). Therefore, the image data file acquired by the image capturing apparatus is connected as being processed by the distributed node A. An example of the connected information is shown in FIG. 8. To identify which job includes the process managed as the table of data base and executed is managed by the "job ID number. Further, it is managed by the "node number" that the present process is performed for which node. Peculiar statuses of the process are in the job and the types of the process data for the statues are provided, such that the information is managed as "process data type". For example, the "process data type" is a type for scanning and transmitting an image file, using the image capturing apparatus, it is required to save the file of the acquired image data and the saving folder exists as the process data type. Although the process data, the file of the acquired image data is saved in the node in this example according to the progress of the process, the fact that where the file is actually saved is managed as "process data information". In this example, the path of the saving folder is managed as a value.

The processor unit 11 requests the distributed node A that is an execution node to process the data through the node communication interface of the communicating unit 12 (ACT 107). The distributed node A gives an instruction of starting scanning for the MFP of the client.

The processor unit 11 determines whether the process was correctly performed in the distributed node A that is an execution node (ACT 108). It is determined that the process was correctly performed, when the image data file was correctly acquired from the MFP of the client (ACT 108, YES) ("correctly performed" case).

The processor unit 11 updates the status information on the job, through a job data managing unit 16 (ACT 109). Since the entire scanning is correctly performed, the status information is changed from "in acquiring of image data file" to "in an OCR process".

The processor unit 11 determines whether the process for the job was completely finished, through the job data managing unit 16 (ACT 110). In this Act, since the OCR process for the job remains, it is determined that the process is not finished and the process continues (ACT 110, NO) ("non-finished" case). That is, the job returns to ACT 103 and is processed by the determination of the server resource on the basis of the updated status information (ACT 103).

Figure 5:
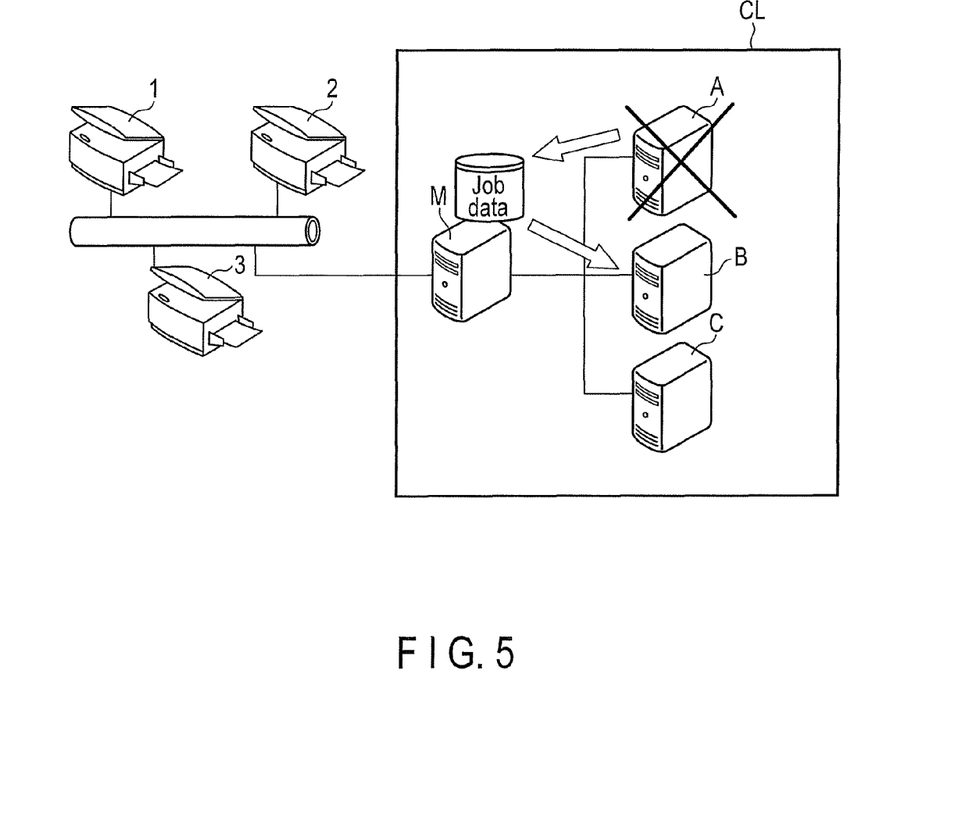
FIG. 5 is a diagram showing an example of an alternative process after malfunction occurs.

The "not correctly performed" case (ACT 108, NO) is described. It is assumed that an OCR process is performed by the same distributed node A, when the status is "in an OCR process". When malfunction occurs in the node A in the OCR process and the OCR process was not correctly performed, it is determined that the process was not correctly performed (ACT 108, NO). Although the OCR process was not finished, the scanned image data file is saved in the cluster, the image process system (master node M) continues the process, using the scanned image data file. The processor unit 11 removes the connection with the distributed node A that is the node that performs the process, which is in connection with the process data of the job, through the process data managing unit 17 (ACT 111). In this ACT, the job returns to ACT 103, with the status information in "OCR process". Next, it is determined that the distributed node A with malfunction is not available (ACT 104). Next, the distributed node A is removed and an appropriate node is selected. It is assumed that the distributed node B is selected. Accordingly, the image data file that is acquired by the distributed node A and managed in the process data managing unit 17 is managed in connection with the distributed node B a new. Further, the processor unit 11 requests the distributed node B to perform an OCR process on the transferred image data file. Therefore, it is possible to keep performing the process without losing the process result up to that time, even if malfunction occurs in the distributed node A (see FIG. 5).

Consequently, it is determined that the entire process was finished (ACT 110, YES) and the job is finished.

Figure 6:
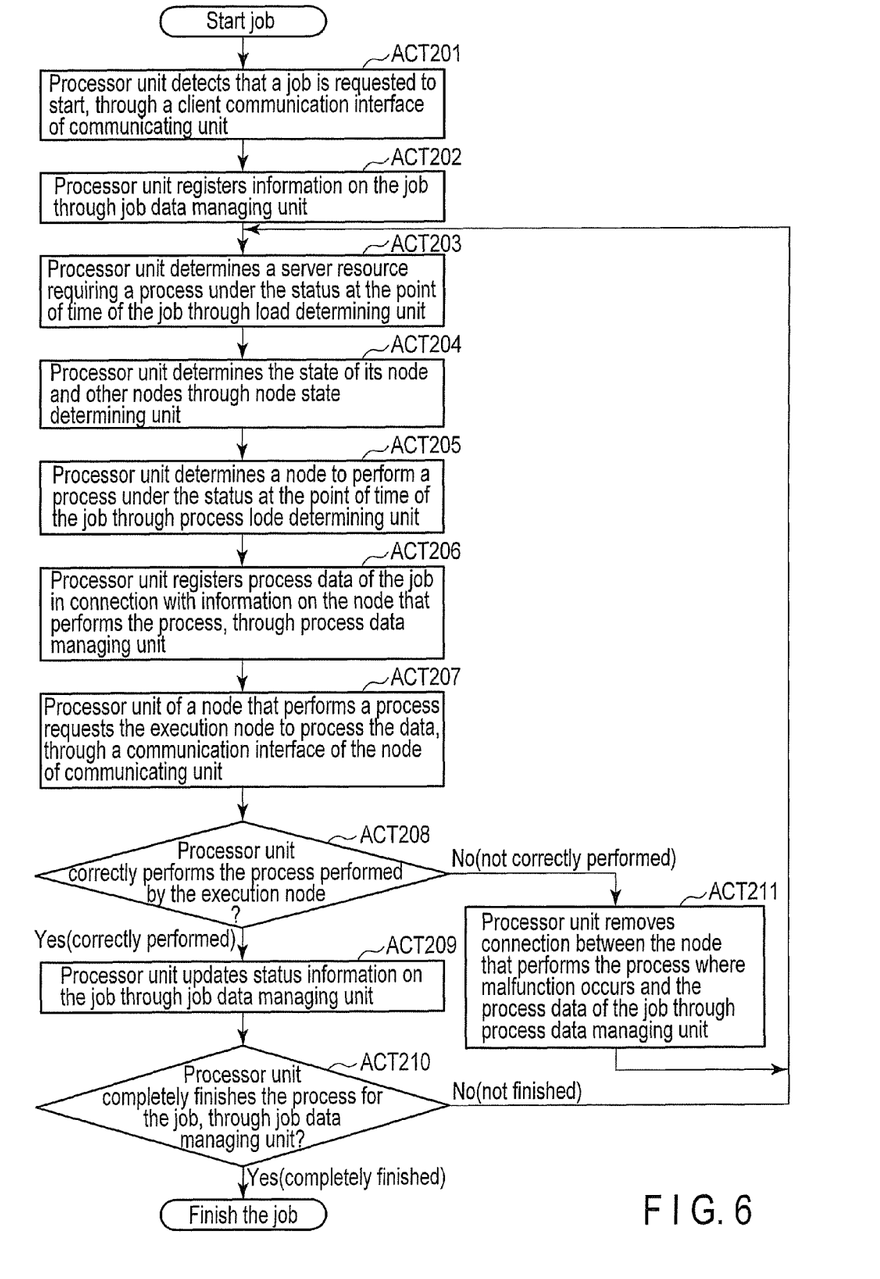
FIG. 6 is a flowchart illustrating a second example of node control.

A second example of node control in the image processing system shown in FIG. 3 is described with reference to FIG. 6. FIG. 6 is a flowchart illustrating the second example of node control in the image processing system shown in FIG. 3.

As shown in FIG. 6, for example, a node controls another node. That is, all of the nodes in the cluster have the same function and the process data managing units 17 of all of the nodes regists and manages a copy of the process result. Therefore, when the processor units 11 and the communicating units 12 of all of the nodes detect that malfunction occurs in the node that is in operation of performing the process, the job of the node with malfunction is assigned again to another node. Accordingly, another node can continue the following process.

For example, an instruction of starting the job is given from the MFP, such as an image processing apparatus, which is a client, and the processor unit 11 (processor unit 11 of a node) detects starting of the job (Act 201). For example, the MFP 1 includes a built-in web browser as a user interface and the web browser gives an instruction of starting the job by executing a web application supplied through the communicating unit 12.

The processor unit 11 registers the information on the job for the job data managing unit 16 (ACT 202). The processor unit 11 gives an ID number that can be specifically identified when a new instruction of starting job is given, and the other information is managed and registered in connection with the ID number.

The processor unit 11 determines a server resource required to perform a process corresponding to the status of the job, through the load determining unit 13 (ACT 203). It is described when an image data file is acquired from the MFP that is a client, as the status of the job. A resource for controlling the operation of the MFP, using the client interface of the communicating unit 12 as a server (node) is required to acquire the image data file by operating the image capturing apparatus of the MFP. An abnormally large amount of band of the network that the communicating unit 12 uses is consumed to acquire the image data file, in some cases. In these cases, the load determining unit 13 determines that the node that is in charge of the process needs a network band and the processor unit 11 determines a required server resource from the determination.

The processor unit 11 determines which state the nodes constituting a cluster through the node state determining unit 14 are in. Since it is determined that a network band is needed in the status while the image data file is acquired, the processor unit 11 asks for an available node (supplied with power and being able to communicate) that which amount of network band is consumed now by the nodes, through the node state determining unit 14, and determines the states of the nodes on the basis of the result (ACT 204).

The processor unit 11 determines a node that performs a process under the status at the time point of the job, herein, a process of transmitting a file with respect to the status while the image data file is acquired, through the process node deciding unit 15 (ACT 205). The determined result in ACT 204 is used for the decision. It is assumed that the distributed node A is decided in the example.

The processor unit 11 registers process data of the job in connection with the information on the node performing the process, through the process data managing unit 17 (Act 206). The image data file acquired by the image capturing apparatus is connected as being processed in the distributed node A.

The processor unit 11 of the node A that processes the job requests for acquiring data through the communication interface with the image capturing apparatus of the communicating unit 12 (ACT 207). The node A gives an instruction of starting scanning for the MFP of the client.

The processor unit 11 determines whether the process was correctly performed by the node A that is the node that performs the process (ACT 208). When the image data file is correctly acquired from the MFP of the client, it is determined that the process is correctly performed (ACT 208, YES) ("correctly performed" case).

The processor unit 11 updates the status information on the job through the job data managing unit 16 (ACT 209). Since all the scanning is correctly performed, the status information is changed from "in acquiring of image data file" to "in an OCR process".

The processor unit 11 determines whether the process for the job was completely finished, through the job data managing unit 16 (ACT 210). In this Act, since the OCR process for the job remains, it is determined that the process is not finished and the process continues (ACT 210, NO) ("non-finished" case). That is, the job returns to ACT 203 and is processed by the determination of the server resource on the basis of the updated status information (ACT 203).

The "not correctly performed" case (ACT 208, NO) is described. The status becomes "in an OCR process" and the OCR process is performed in the same node A. In the OCR process, the image data file is acquired for each page and the OCR process of the image data file for each page is performed by one page. When malfunction occurs in the node A in the process of a page and the OCR process of all of the pages is not correctly finished, it is determined that the process was not correctly performed (ACT 208, NO).

Although the OCR process is not completed, the scanned image data file and the ORC-processed data till the page of all the pages are saved in the node A that performs the process in the cluster, such that the image processing system keeps performing the process, using the data. The processor unit 11 removes connection with the node A that is the node that performs the process being in connection with the process data of the job, through the process data managing unit 17 (ACT 211). In this ACT, the job returns to ACT 203, with the status information in "OCR process". Next, it is determined that the node A with the malfunction is not available (ACT 204). Next, the node A is removed and an appropriate node is selected. It is assumed that the node B is selected. Therefore, the image data file managed in the process data managing unit 17 of the node A, which is acquired in advance by the node A and the information on the text that is OCR-processed till the page of all the pages are managed in connection with the new node B. The processor unit 11 of the distributed node B requests an OCR-processing on the transferred image data file. In this case, the image data file and the information on the text that was OCR-processed till the page of all the pages may be used by the node B while being managed by the process data managing unit 17 of the node A, and some or all of the image data file and information from the node A to the node B may be copied or moved and used. When a server resource is consumed for the copying or moving, an appropriate method may be automatically selected in consideration of the load. Accordingly, it is possible to continue the process, without losing the process result up to that time, even if malfunction occurs in the node A.

Consequently, it is determined that the entire process was finished (ACT 210, YES) and the job is finished.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data processing apparatus comprising:
a communicating unit that communicates with a plurality of external apparatuses;

a process data managing unit that receives first process information on a first process that is performed by a first external apparatus in the plurality of external apparatuses, via the communicating unit, and manages the first process information and a first process result corresponding to the first process; and a control unit that transmits the first process result managed by the process data managing unit to a second external apparatus of the plurality of external apparatuses on the basis of the first process information managed by the process data managing unit, via the communicating unit, in accordance with a trouble of the first external apparatus, and instructs the second external apparatus to perform a second process following the first process to the second external apparatus.

2. The apparatus according to claim 1, further comprising:
a detecting unit that detects the state of the plurality of external apparatuses through the communicating unit; and
a selecting unit that selects the second external apparatus that is in charge of the second process in the plurality of external apparatuses, on the basis of the state of the plurality of external apparatuses.

3. The apparatus according to claim 1, further comprising:
a load determining unit that determines a resource required for the first process; and
a selecting unit that selects the second external apparatus that is in charge of the second process in the plurality of external apparatuses, on the basis of the resource.

4. The apparatus according to claim 1, further comprising:
a detecting unit that detects the state of the plurality of external apparatuses through the communicating unit;
a load determining unit that determines a resource required for the first process; and
a selecting unit that selects the second external apparatus that is in charge of the second process in the plurality of external apparatuses, on the basis of the state of the plurality of external apparatuses and the resource.

5. The apparatus according to claim 1,
wherein the process data managing unit manages first process information on the first process for acquiring an image data file that is performed by the first external apparatus, and a first process result corresponding to the first process, and
the control unit transmits the image data file corresponding to the first process result with respect to the second external apparatus, and instructs the second external apparatus to perform an instruction of performing the second process of recognizing character information included in the image data file.

6. The apparatus according to claim 1,
wherein the process data managing unit manages the first process information on the first process for recognizing character information included in the first page of an image data file that is performed by the first external apparatus, and the first process result corresponding to the first process, and
the control unit transmits a character recognition result of the first page corresponding to the first process result with respect to the second external apparatus and instructs the second external apparatus to perform the second process for recognizing character information included in the second page of the image data file.

7. The apparatus according to claim 1,
wherein the process data managing unit acquires an image data file that is performed by the first external apparatus and manages the first process information on the first process corresponding to character information recognition included in the first page of the image data file and the first process result corresponding to the first process, and the control unit transmits the image data file corresponding to the first process result and a character recognition result of the first page with respect to the second external apparatus and instructs the second external apparatus to perform the second process for recognizing character information include in the second page of the image data file.

8. An image processing system comprising:
an image data reading apparatus that reads an image and transmits an image data file corresponding to the image;
a plurality of image data processing apparatus that processes the image data file; and
a managing apparatus that manages the plurality of image data processing apparatus, and
wherein the managing apparatus includes:
a communicating unit that communicates with a plurality of image data processing apparatuses;
a process data managing unit that receives first process information on a first process that is performed by a first image data processing apparatus in the plurality of image data processing apparatuses, via the communicating unit, and manages the first process information and a first process result corresponding to the first process; and
a control unit that transmits the first process result managed by the process data managing unit to a second image data processing apparatus of a plurality of image data processing apparatuses on the basis of the first process information managed by the process data managing unit, via the communicating unit, in accordance with a trouble of the first image data processing apparatus, and instructs the second image data processing apparatus to perform a second process following the first process.

9. The system according to claim 8,
wherein the process data managing unit manages first process information on the first process for acquiring an image data file that is performed by the first image data processing apparatus, and a first process result corresponding to the first process, and
the control unit transmits the image data file corresponding to the first process result with respect to the second image data processing apparatus, and instructs the second image data processing apparatus to perform the second process of recognizing character information included in the image data file.

10. The system according to claim 8,
wherein the process data managing unit manages the first process information on the first process for recognizing character information included in the first page of an image data file that is performed by the first image data processing apparatus, and the first process result corresponding to the first process, and
the control unit transmits a character recognition result of the first page corresponding to the first process result with respect to the second image data processing apparatus and instructs the second image data processing apparatus to the second process for recognizing character information included in the second page of the image data file.

11. The system according to claim 8,
wherein the process data managing unit acquires an image data file that is performed by the first image data processing apparatus and manages the first process information on the first process corresponding to character information recognition included in the first page of the image data file and the first process result corresponding to the first process, and the control unit transmits the image data file corresponding to the first process result and a character recognition result of the first page with respect to the second image data processing apparatus and instructs the second image data processing apparatus to perform the second process for recognizing character information include in the second page of the image data file.

12. A data processing method comprising:

communicating with a plurality of external apparatuses;

managing, by a system that includes a processor, first process information on a first process that is performed by a first external apparatus in the plurality of external apparatuses, and a first process result corresponding to the first process; and transmitting, by the system, the first process result to a second external apparatus of a plurality of external apparatuses on the basis of the first process information, in accordance with a trouble of the first external apparatus, and instructing the second external apparatus to perform a second process following the first process with the second external apparatus.

13. The method according to claim 12, further comprising:

detecting, by the system, a state of the plurality of external apparatuses; and selecting, by the system, the second external apparatus that is in charge of the second process in the plurality of external apparatuses on the basis of the state of the plurality of external apparatuses.

14. The method according to claim 12, further comprising:

determining, by the system, a resource required for the first process; and selecting, by the system, the second external apparatus that is in charge of the second process in the plurality of external apparatuses on the basis of the resource.

15. The method according to claim 12, further comprising:

detecting, by the system, a state of the plurality of external apparatuses;

determining, by the system, a resource required for the first process; and selecting, by the system, the second external apparatus that is in charge of the second process in the plurality of external apparatuses on the basis of the state of the plurality of external apparatuses and the resource.

16. The method according to claim 12, further comprising:

managing, by the system, first process information on the first process for acquiring an image data file that is performed by the first external apparatus, and a first process result corresponding to the first process; and transmitting, by the system, the image data file corresponding to the first process result with respect to the second external apparatus, and instructing the second external apparatus to perform the second process of recognizing character information included in the image data file.

17. The method according to claim 12, further comprising:

managing, by the system, the first process information on the first process for recognizing character information included in the first page of an image data file that is performed by the first external apparatus, and the first process result corresponding to the first process and transmitting, by the system, a character recognition result of the first page corresponding to the first process result with respect to the second external apparatus, and instructing the second external apparatus to perform the second process for recognizing character information included in the second page of the image data file.

18. The method according to claim 12, further comprising:

acquiring, by the system, an image data file that is performed by the first external apparatus, and managing the first process information on the first process corresponding to character information recognition included in the first page of the image data file and the first process result corresponding to the first process and transmitting, by the system, the image data file corresponding to the first process result and a character recognition result of the first page with respect to the second external apparatus, and instructing the second external apparatus to perform the second process for recognizing character information include in the second page of the image data file.

* * * * *